UNITED STATES PATENT OFFICE.

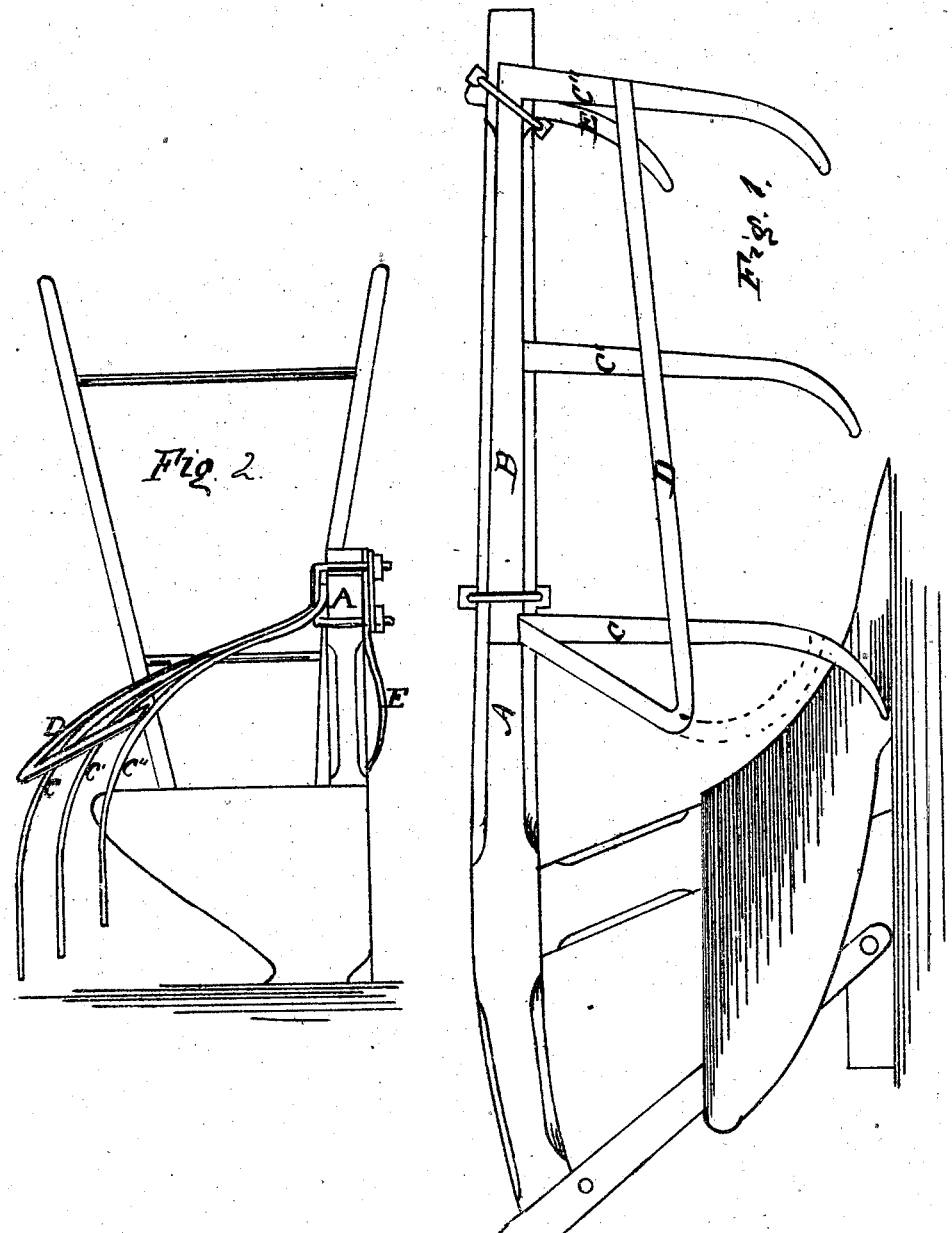

STEPHEN COLLINS, OF PRESCOTT, WISCONSIN.

IMPROVEMENT IN DEVICES FOR TURNING DOWN AND BURYING STALKS, WEEDS, &c.

Specification forming part of Letters Patent No. 74,666, dated February 18, 1868.

*To all whom it may concern:*

Be it known that I, STEPHEN COLLINS, of Prescott, in the county of Pierce and State of Wisconsin, have invented a new and useful Attachment to Plows for Turning Down and Burying Stalks, Weeds, Brush, &c.; and I do hereby declare that the following is a full, clear, and exact description thereof, reference being had to the accompanying drawing, making part of this specification.

My invention relates to burying the corn-stalks, weeds, brush, &c., in breaking up ground, both for the purpose of benefiting the soil, and to place them out of reach of the plow in the after-culture of the crop; and consists in attaching arms of suitable form to the side of the plow-beam to turn down the stalk and weeds, and straighten them along in the bottom of the preceding furrow, in which they hold them until they are buried by the soil as it is turned over by the plow.

Figure 1 is a side elevation of a common breaking-plow, with my device for turning down the weeds attached thereto. Fig. 2 is a front-end elevation of the same.

Similar letters of reference indicate corresponding parts in the several figures.

The following description will enable skilled artisans to make and use my invention.

The device that I have contrived to turn down the stalks and weeds consists in the curved arms C C' C'', attached to the horizontal bar B, by which they are secured to the side of the plow-beam A by means of stirrup-clamps, or other suitable means, as shown. The arms C C' C'' extend outward to about the middle of the preceding furrow, their points reaching nearly to the bottom of it. They are given such curve as to drag the stalks and weeds into the furrow, and, at the same time, straighten them along and turn them down into it, and hold them until covered by the soil as it is turned over by the plow.

It will be observed that the forward arm C'' is situated near the forward end of the plow-beam, and the rear arm opposite the mold-board. This arrangement of the arms is important, as it requires the forward arm to break down and straighten the stalks and weeds along the furrow, while the rear one holds them from being thrown out while the soil is turned over them by the plow. The middle arm C' may be left off, though generally it will be found useful, especially for long stalks or weeds. The arms C C' C'' are attached to the plow-beam, so as to be adjusted both vertically and longitudinally, and may be set as found to be most effective. The device may be applied to either right or left hand plows.

The arms are braced about their middle by the longitudinal bar D, as shown, which may be bolted or otherwise secured thereto. The rear end of brace D extends backward in the form of an elbow, as shown, to prevent the short stalks and weeds from being thrown out of the furrow by the pressure of the dirt, and holds them until covered by it as it is turned over by the plow. I also contemplate arranging the rear part of this brace as indicated by the dotted lines in Fig. 1.

Near the forward end of the beam, and on the opposite side from arms C'', I attach a single arm, E, in the manner of the ordinary colter, except that the lower end is curved backward and toward the furrow. The use of this arm is to straighten the straggling stalks and weeds on that side, and is especially useful when they are short. It also opens the track for the plow, and keeps the weeds and stalks from lodging against the plow-standard and clogging it. This arm may be used or left off, as found necessary, there being times when it will not be required. It is also adjustable vertically, and the lower end may be turned backward more or less, as found most effective.

Having thus fully described my invention, what I claim as new, and desire to secure by Letters Patent, is—

The arms C, C', C'', and E and brace D, attached to the plow-beam, substantially as and for the purpose set forth.

STEPHEN COLLINS.

Witnesses:
WM. H. WEEKS,
O. F. MAYHEW.